United States Patent [19]
Adams et al.

[11] Patent Number: 6,156,285
[45] Date of Patent: Dec. 5, 2000

[54] METHOD FOR DENSIFYING PARTICULATE SILICA

[75] Inventors: Gary Hamilton Adams, Elizabethtown, Ky.; Jon Vierling DeGroot, Jr.; Patrick John Miller, both of Midland, Mich.; Christopher Allen Stafford, LaGrange, Ky.

[73] Assignee: Dow Corning Corporation, Midland, Mich.

[21] Appl. No.: 09/190,586

[22] Filed: Nov. 12, 1998

[51] Int. Cl.$^7$ ................................................ C01B 33/12
[52] U.S. Cl. .............................................. 423/335; 524/492
[58] Field of Search ............................. 423/335; 524/492

[56] References Cited

U.S. PATENT DOCUMENTS

| | | | |
|---|---|---|---|
| 3,077,465 | 2/1963 | Bruner | 260/46.5 |
| 3,114,930 | 12/1963 | Olham et al. | 18/1 |
| 3,159,601 | 12/1964 | Ashby | 260/46.5 |
| 3,161,614 | 12/1964 | Brown et al. | 260/46.5 |
| 3,175,993 | 3/1965 | Weyenberg | 260/46.5 |
| 3,220,972 | 11/1965 | Lamoreaux | 260/46.5 |
| 3,296,291 | 1/1967 | Chalk et al. | 260/448.2 |
| 3,334,067 | 8/1967 | Weyenberg | 260/46.5 |
| 3,445,420 | 5/1969 | Kookootsedes et al. | 260/37 |
| 3,516,946 | 6/1970 | Modic | 252/429 |
| 3,632,247 | 1/1972 | Loffler | 425/135 |
| 3,664,385 | 5/1972 | Carter | 141/12 |
| 3,814,730 | 6/1974 | Karstedt | 260/46.5 |
| 3,817,909 | 6/1974 | Toporcer et al. | 260/37 |
| 3,928,629 | 12/1975 | Chandra et al. | 427/387 |
| 3,989,668 | 11/1976 | Lee et al. | 260/46.5 |
| 3,996,184 | 12/1976 | Klosowski | 260/32.6 |
| 4,126,423 | 11/1978 | Kongsgaarden | 23/293 |
| 4,126,424 | 11/1978 | Kongsgaarden | 23/293 |
| 4,325,686 | 4/1982 | Leon et al. | 425/371 |
| 4,326,852 | 4/1982 | Kratel et al. | 23/293 |
| 4,657,967 | 4/1987 | Klosowski et al. | 524/860 |
| 4,780,108 | 10/1988 | Razzano | 23/293 |
| 4,822,830 | 4/1989 | Adkins | 523/203 |
| 4,871,827 | 10/1989 | Klosowski et al. | 528/17 |
| 4,877,595 | 10/1989 | Klingle et al. | 423/335 |
| 4,940,571 | 7/1990 | Su | 423/339 |
| 4,973,623 | 11/1990 | Haugsby et al. | 524/863 |
| 5,036,117 | 7/1991 | Chung et al. | 522/172 |
| 5,052,874 | 10/1991 | Johanson | 414/326 |
| 5,160,470 | 11/1992 | Graville et al. | 264/123 |
| 5,683,528 | 11/1997 | Partlow | 156/89 |

*Primary Examiner*—Paul R. Michl
*Attorney, Agent, or Firm*—William F. Boley

[57] ABSTRACT

A method for densifying particulate silica and a method for compounding a curable silicone composition comprising a reinforcing silica filler. The method is particularly useful for densifying particulate silica to be used as a continuous feed to a compounding apparatus for preparing curable silicone compositions.

11 Claims, 1 Drawing Sheet

METHOD FOR DENSIFYING PARTICULATE SILICA

BACKGROUND OF INVENTION

The present invention is a method for densifying particulate silica and a method for compounding a curable silicone composition comprising the densified particulate silica. The method is particularly useful for densifying particulate silica to be used as a continuous feed to a compounding apparatus for forming curable silicone compositions.

Particulate silica is a well know reinforcing filler commonly employed to improve the physical properties of organic rubber and silicone rubber and sealants. The particulate silica can typically have a surface area within a range of about 50 $m^2/g$ to 1000 $m^2/g$ and a pour bulk density of about 25 $kg/m^3$ to 64 $kg/m^3$. A major disadvantage of such low bulk density silica is that it is relatively expensive to ship and store. An additional disadvantage of such low bulk density silica is that an inability to feed sufficient amounts to continuous compounding equipment to achieve desired silica levels may limit the capacity of the equipment. According it is desirable to provide a means for increasing the bulk density of particulate silica in order to overcome the above described shortcomings, while at the same time not altering the silica so as to compromise the properties imparted to compositions in which it is incorporated.

There are known mechanical means for increasing the bulk density of a particulate material. Oldham et al., U.S. Pat. No. 3,114,930, teach the use of a vacuum to remove air from aerated powdered materials thereby increasing the density.

Carter, U.S. Pat. No. 3,664,385, teaches compacting finely divided particles by utilizing a rotating screw feeder positioned in a vertically orientated housing having a porous sleeve to which a vacuum is applied.

Kongsgarreden, U.S. Pat. No. 4,126,424, teaches a method for compacting silica dust where the dust is charged to a cylindrical hopper and then is injected with air under pressure to densify the dust.

Kongsgaarden, U.S. Pat. No. 4,126,423, teaches a method for increasing the bulk density of silica dust using a drum having internal ribs.

Loffler, U.S. Pat. No. 3,632,247, teaches a process where powders are compressed and deaerated between vacuum cylinders which are arranged in groups requiring different vacuum and connected to a common vacuum line.

Leon et al., U.S. Pat. No. 4,325,686, teach a powder densifying apparatus comprising a pair of opposed gas-permeable belts arranged to either side of a common axis so as to define a generally convergent densifying zone between their adjacent faces.

Kratel et al., U.S. Pat. No. 4,326,852, teach a method for increasing the bulk weight of silicon dioxide by means of vacuum pressure applied at a filter face where the silicon dioxide is moved by means of a conveyor screw whose longitudinal axis is arranged parallel with respect to the filter face and which preferably has a decreasing thread pitch in the feeding direction. Kratel et al. teach the use of the densified silicon dioxide as a filler for polymeric masses including polydiorganosiloxanes.

Klingle et al., U.S. Pat. No. 4,877,595, teach the compression of pyrogenically prepared silica by a rotary filter equipped with a pressing band.

Graville et al., U.S. Pat. No. 5,160,470, teach a method for densifying colloidal silica recovered from a smelting process. The method comprises feeding the silica by a horizontal feed means to a pair of vertically juxtaposed pressure rolls having surface depressions.

Razzano, U.S. Pat. No. 4,780,108, teaches a method for increasing the bulk density of low bulk density materials, such as silica, by intimately admixing a low bulk density material and an organic or polyorganosiloxane liquid and thereafter removing substantially all of the organic or polyorganosiloxane liquid by, for example, evaporation. Razzano teaches that a problem typically associated with mechanical methods for densifying silica is the formation of unacceptably high amounts of agglomerates and grit. Razzano further describes how such silicas no longer disperse as well in silicone compositions as silicas with lower bulk density.

Johanson, U.S. Pat. No. 5,052,874, describes an apparatus for densifying particulate solids useful in the present invention. Although Johanson describes the use of the apparatus for densifying particulate solids, he has not identified the specific use for densifying particulate silica nor that such use provides for densified silica having improved reinforcing capacity in rubber compositions when compared to silica densified by certain other mechanical means of densification.

SUMMARY OF INVENTION

The present invention is a method for densifying particulate silica and a method for compounding a curable silicone composition comprising a reinforcing silica filler. The method is particularly useful for densifying particulate silica to be used as a continuous feed to a compounding apparatus for preparing curable silicone compositions.

DESCRIPTION OF INVENTION

Figure 1:
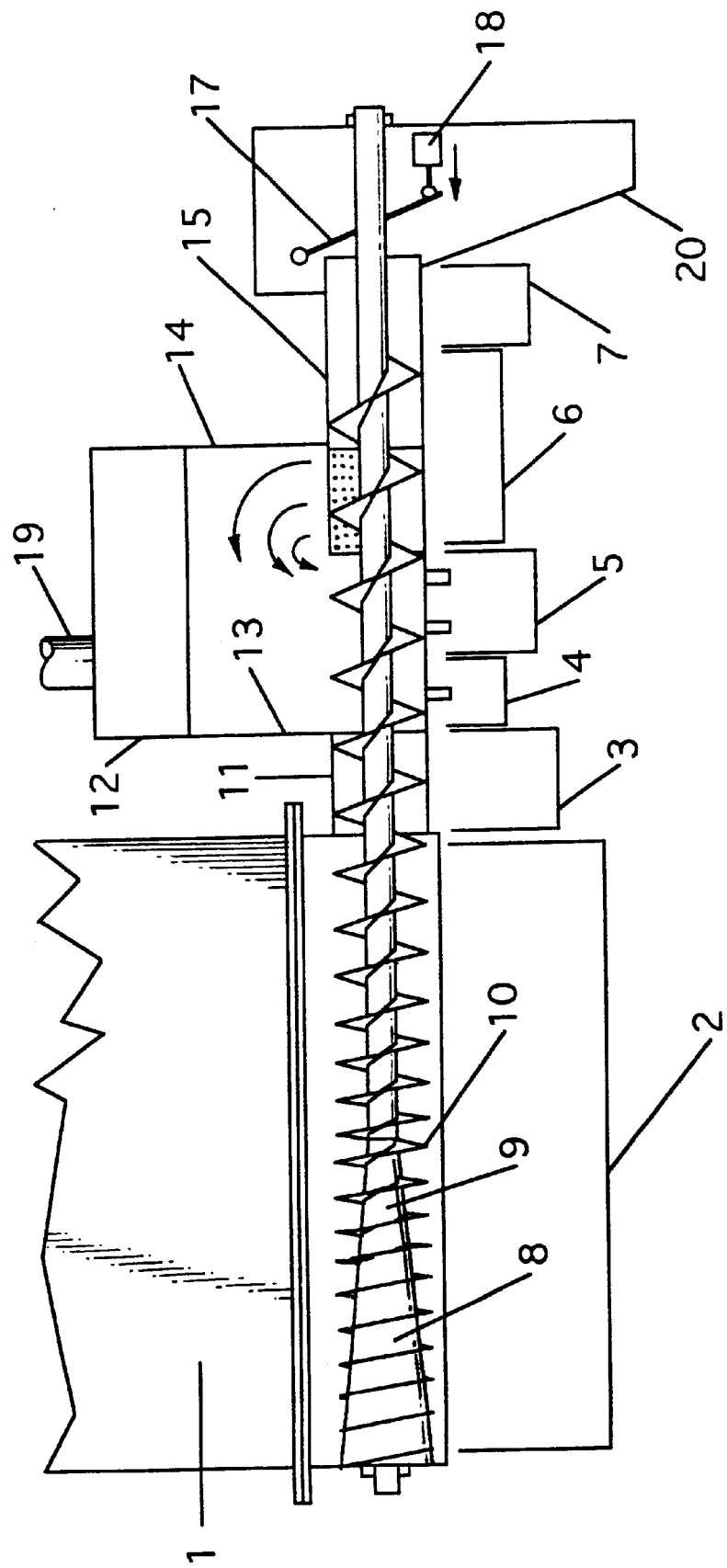
FIG. 1 shows a cross-sectional schematic representation of the compacting apparatus useful in the present invention.

A first embodiment of the present invention is a method for densifying particulate silica and a second embodiment is the densified silica prepared thereby. The method comprises feeding particulate silica to a compacting apparatus comprising in combination a screw feeder comprising a thread and extending in a horizontal direction and including a number of sections arrayed in succession along the screw feeder length so as to subject the particulate silica to a succession of operations, the sections including a) a feeding section extending into a source chamber for drawing particulate solids from the source chamber into the compacting apparatus, b) a feed seal section, adjacent the feeding section where the screw feeder thread has the same pitch as in the adjacent portion of the feeding section, c) a conveying section adjacent to the feed seal section where the screw feeder thread has a pitch greater than in the feed seal section to provide greater solids-moving capacity than in the feed seal section, d) a recirculating section adjacent the conveying section where the screw feeder thread has substantially the same pitch as in the conveying section, e) a high pressure section where the screw feeder thread has substantially the same pitch as in the recirculating section, f) a recirculation chamber through which the screw feeder extends, the recirculation chamber including i) a feeder seal shroud closely surrounding the feed seal section of the screw feeder and ii) a high pressure shroud closely surrounding the high pressure section and having an output end, the recirculation chamber further enclosing the conveying section and the recirculation section to confine particulate silica blown out of the high pressure section of the screw feeder as the particulate silica is compressed thereby, and g) a hinge mounted preloaded cover in yieldable sealing engagement with the output end of the high pressure shroud to permit densified particulate silica pressurized by the high pressure section to emerge under pressure from the high pressure shroud.

The particulate silica densified by the present method can be any of those silicas known in the art for use as filler in organic and synthetic rubber compositions and are generally those essentially dry particulate silicas having a bulk density less than about 64 kg/m$^3$. By "essentially dry" it is meant that the silica typically has only that moisture present that is typically associated with contact with ambient air and is not in a suspension or slurry. The particulate silica can be for example, fumed silica, precipitated silica, colloidal silica, and silica gels. A preferred silica to be densified by the present method is a fumed silica prepared by the high-temperature oxidation of a halosilane such as tetrachlorosilane, trichlorosilane, or methyltrichlorosilane and having a BET surface area within a range of about 50 m$^2$/g to 1000 m$^2$/g. Even more preferred is a fumed silica having a BET surface area within a range of about 75 m$^2$/g to 500 m$^2$g and a bulk density less that about 64 kg/m$^3$.

The method of feeding the particulate silica to the compacting apparatus is not critical to the present invention and can be any of those known in the art, such as gravity feed from a hopper or gravity feed in conjunction with a non-compacting transport screw. In a preferred method the particulate silica is feed continuously by gravity feed from a hopper as illustrated in FIG. 1.

The compacting apparatus useful in the present invention is that described in Johanson, U.S. Pat. No. 5,052,874, which is incorporated by reference for such teaching. FIG. 1 shows a preferred embodiment of the compacting apparatus, but is not intended to limit those embodiments described in U.S. Pat. No. 5,052,874. The compacting apparatus illustrated in FIG. 1 has attached thereto source chamber 1 from which particulate silica is fed. The compacting apparatus consisted of a number of physically distinctive sections 2–7 that are arranged in succession along its length and whose physical structure is related to the function of the particular section. Extending through sections 2–7 is screw feeder 8 consisting of rotatable shaft 9, which is tapered in the preferred embodiment as illustrated, and thread 10 the pitch of which is varied as described below.

Feed section 2 lies directly beneath source chamber 1 and communicates with it so that the particulate silicon in source chamber 1 can freely descend into feed section 2 which draws the particulate solid toward the right as viewed in FIG. 1. In feed section 2, screw feeder 8 has a structure which produces an increase in capacity in the direction of draw by using a combination of variable screw pitch and variable shaft diameter. In the preferred embodiment the pitch does not exceed 0.6 times the maximum diameter of the thread. Connected to feed section 2 is feed seal section 3. Feed seal section 3 includes feeder seal shroud 11 that connects recirculation chamber 12 with feed section 2 and that closely surrounds screw feeder 8. The purpose of feed seal section 3 is to limit the intake of particulate silica to prevent overfeeding of silica into recirculating chamber 12.

In feed seal section 3, thread 10 of screw feeder 8 has a constant pitch which is the same as the pitch in the immediately adjacent portion of feeding section 2.

Conveying section 4 is located immediately downstream of feed seal section 3. Conveying section 4 provides a buffer between feed seal section 3 and recirculation section 5 to prevent recirculated particulate silica from backing up the flow. For this reason in conveying section 4, thread 10 is given a sudden increase in pitch relative to the pitch of thread 10 in feed seal section 3. It is preferred that thread 10 in conveying section 4 have a pitch equal to the diameter of screw feeder 8 in this section. Thread 10 in recirculation section 5 has the same pitch as in conveying section 4 and serves to push the recirculated particulate silica into high pressure section 6.

Positioned above sections 4–6 is recirculation chamber 12 which has vertical wall 13 and vertical wall 14 and includes high pressure shroud 15 that extends downstream. High pressure shroud 15 also extends upstream into recirculation chamber 12 and includes a large number of perforations. This perforated section of high pressure shroud 15 allows air to escape when the particulate silica is brought under the larger pressure associated with screw feeder 8 in high pressure shroud 15. As seen in FIG. 1, recirculation chamber 12 is expanded in size to insure gas disengagement from the particulate silica. High pressure shroud 15 has downstream end 16 which is blocked by preloaded cover 17 that is urged against downstream end 16 by pneumatic ram 18. Compaction of the particulate silica occurs as the silica is pushed by screw feeder 18 against preloaded cover 17. As the silica is compressed the air entrained in the silica is forced back into recirculation chamber 12 from which it is vented through vent 19. Some of the particulate silica is also carried along with the expressed air back into recirculation chamber 12 where it eventually settles back into the path of screw feeder 8. Also shown in FIG. 1 is chute 20 which serves to transfer the compacted particulate silica to an appropriate receiving container or apparatus without entrainment of air.

A third embodiment of the present invention is a curable silicone composition comprising a reinforcing particulate silica densified by the above described method. When used in a curable silicone composition as a reinforcing filler, it is preferred that the particulate silica be a fumed silica having a surface area within a range of about 75 m$^2$/g to 500 m$^2$/g and a bulk density of less than about 64 kg/m$^3$ before densification and a bulk density of 64 kg/m$^3$ or greater after densification. Preferred is a fumed silica having a bulk density within a range of about 80 kg/m$^3$ to 160 kg/m$^3$ after densification.

When used in a curable silicone composition the densified silica may be treated to make hydrophobic. The densified particulate silica may be treated prior to addition to the curable silicon composition or in situ during compounding of the curable silicone composition. Such treating agents and methods for treating particulate silica is well known in the art and include treatment with organosilicon compounds that can hydrolyze to form silanol-contain functionality such as organochlorosilanes, organodisilazanes, cyclic polydiorganosiloxanes, and linear polydiorganosiloxanes. When the curable silicone composition is a curable silicone rubber composition, it is generally preferred that the particulate silica be treated to make hydrophobic.

The amount of densified particulate silica added to the curable silicone composition is dependent upon the particular composition and its intended use. Generally about 1 weight percent to 70 weight percent of the densified particulate silica based on the total weight of the composition, may be useful. About 5 weight percent to 50 weight percent of the densified particulate silica based on the total weight of the composition is typically preferred.

The curable silicone composition can be any of those known in the art that are known to benefit from the reinforcing properties of added particulate silica. Preferred is when the curable silicone composition is a curable silicone sealant composition or curable silicone rubber composition.

The curable silicone composition can be any of those room temperature curing (RTV) silicone sealant compositions known in the art. Typically these RTV silicone sealant compositions are prepared by mixing a polydiorganosiloxane having hydrolyzable end-terminal groups, a moisture-sensitive crosslinker having hydrolyzable groups bonded to silicon, and a filler. A catalyst is also typically added in order for curing to occur in a satisfactory time frame. Optional ingredients can include pigments, oxidation inhibitors, adhesion promoters, and dielectric materials such as carbon black and graphite. In such RTV silicone sealant compositions the hydrolyzable groups bonded to silicon can be for example alkoxy, acetoxy, ketoximo, aminoxy, and amino.

The RTV silicone sealant composition can be, for example, obtained by mixing a hydroxy endblocked polydiorganosiloxane, densified particulate silica, and a ketoximosilicon crosslinker having at least three silicon-bonded ketoximo groups per molecule. The ketoximosilicon crosslinker can be a mixture of ketoximosilanes and alkoxyketoximosilanes. One such ketoximosilane mixture comprises methyltri(methylethylketoximo)silane, methyldi(methylethylketoximo)methoxysilane, and methyldimethoxy(methylethylketoximo)silane and another ketoximosilane mixture comprises a mixture of tetraketoximosilane, ethoxytri(methylethylketoximo)silane, diethoxydi(methylethylketoximo)silane, and triethoxy(metylethylketoximo)silane. The latter mixture is known in the art, for example in Klosowki et al., U.S. Pat. No. 4,657,967 and in Haugsby et al., U.S. Pat. No. 4,973,623, both of which are hereby incorporated by reference to show ketoximosilane mixtures and RTV silicone sealant compositions made using ketoximosilane crosslinker mixtures.

The RTV silicone sealant composition can be, for example, an RTV silicone sealant composition obtained by mixing a hydroxy endblocked polydiorganosiloxane, densified particulate silica, and an aminoxysilicon crosslinker and preferably a diorganodi(amido)silane such as methylvinyldi(N-methylacetamido)silane, which acts both as crosslinker and chain extender. These type of RTV silicone sealant compositions are described in Toporcer et al., U.S. Pat. No. 3,817,909 and Klosowski, U.S. Pat. No. 3,996,184, both of which are hereby incorporated by reference to show aminoxysilicon crosslinkers and mixtures of aminoxysilicon crosslinkers with diorganodi(amido)silane chain extenders.

The RTV silicone sealant composition can be, for example, an RTV silicone sealant composition obtained by mixing a polydiorganosiloxane, densified particulate silica, and an alkoxysilicon crosslinker, such as n-propyl orthosilicate or ethylpolysilicate and a tin catalyst. Examples of such compositions and methods for their preparation are described in, for example, Brown et al., U.S. Pat. No. 3,161,614; Weyenberg, U.S. Pat. No. 3,175,993; Weyenberg U.S. Pat. No. 3,334,067; and Klosowski et al., U.S. Pat. No. 4,871,827 which are hereby incorporated by reference to show such RTV sealant compositions and methods for their preparation.

The RTV silicone sealant composition can be, for example, those having hydrolyzable amino groups bonded to silicon atoms such as described in Adkins, U.S. Pat. No. 4,822,830, which hereby incorporated by reference to show such RTV sealant compositions and methods for their preparation.

The RTV silicone sealant composition can be, for example, those having acetoxy groups bonded to silicon atoms as described in Bruner, U.S. Pat. No. 3,077,465.

The curable silicone composition can be, for example, a curable silicone rubber composition. The curable silicone rubber composition can be any of those known in the art to which a reinforcing particulate silica is added and can range from high-consistency compositions having the handling characteristics of a gum to low-consistency compositions typically referred to as liquid silicone rubber (a.k.a. LSR). The curable silicone rubber compositions which may have compounded therein the densified particulate silica of the present invention typically include a polydiorganosiloxane, a crosslinking agent, reinforcing particulate silica filler, and a catalyst to facilitate crosslinking. The catalyst can be for example non-specific organoperoxides, vinyl-specific organoperoxides, and platinum group metal hydrosilation catalysts.

The curable silicone rubber compositions can, for example, be any such known compositions which cure by means of a hydrosilation reaction catalyzed by a platinum group metal catalyst. Generally, such platinum group metal curable silicone rubber compositions can have a formulation comprising a polydiorganosiloxane described by formula $R^1R^2{}_2SiO(R^2{}_2SiO)_nSiR^1R^2{}_2$, where each $R^1$ is an independently selected alkenyl group, each $R^2$ is an independently selected monovalent hydrocarbon group comprising from 1 to about 12 carbon atoms, and n is a number such that the polydiorganosiloxane has a viscosity ranging from that of a fluid to that of a gum at 25° C.; an organohydrogensiloxane crosslinker, and a platinum group metal catalyst. substituents $R^1$ of the polydiorganosiloxane can be, for example vinyl, allyl, and hexenyl, with vinyl being preferred. Substituents $R^2$ of the polydiorganosiloxane can be, for example, alkenyl, alkyl, cycloalkyl, substituted alkyl, and aryl. substituents $R^2$ can be, for example, methyl, 3,3,3-trifluoropropyl, and phenyl. Preferred are those curable silicone rubber compositions where $R^1$ is vinyl, $R^2$ is selected from the group consisting of methyl, 3,3,3-trifluoropropyl, and phenyl and at least 50 mole percent of the substituents on silicon are methyl. The organohydrogensiloxane crosslinker can contain on average at least three silicon-bonded hydrogen atoms per molecule and no more than one silicon-bonded hydrogen atom per silicon atom, the remaining valences of the silicon atoms being satisfied by divalent oxygen atoms or by monovalent hydrocarbon radicals comprising one to about seven carbon atoms. The monovalent hydrocarbons radicals can be for example, alkyls such as methyl ethyl, propyl, tertiary butyl, and hexyl; cycloalkyls such as cyclopentyl and cyclohexyl; aryls such as phenyl and tolyl; and halogen substituted alkyls such as chloromethyl, 3,3,3-trifluoropropyl and perfluoropropyl. Generally, it is preferred that all of the monovalent hydrocarbon radicals of the organohydrogensiloxane are methyl. Examples of organohydrogensiloxanes which may be useful as crosslinkers in the present curable silicone rubber compositions are described in Lee et al., U.S. Pat. No. 3,989,668, which is hereby incorporated by reference. The organohydrogensiloxane crosslinker can be linear, cyclic, or branched oligomers or mixtures thereof.

The platinum group metal catalysts suitable for curing such curable silicone rubber compositions can be any such catalyst which is known to catalyze the reaction of silicon-bonded hydrogen atoms with silicon-bonded alkenyl groups.

By "platinum group metal" it is meant ruthenium, rhodium, palladium, osmium, iridium, and platinum. Such catalyst and useful concentrations are described in, for example, Willing, U.S. Pat. No. 3,419,593; Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation. A preferred catalyst for the curable silicone rubber composition curing by a hydrosilation reaction is a reaction product of chloroplatinic acid and symdivinyltetramethyldisiloxane.

The platinum curable silicone rubber compositions may contain inhibitors such as described in Kookootsedes et al., U.S. Pat. No. 3,445,420 and in Chung et al., U.S. Pat. No. 5,036,117 which are incorporated herein by reference.

In still another embodiment the present invention is a method for compounding a curable silicone composition comprising a reinforcing densified particulate silica. The method comprises densifying a particulate silica having a surface area within a range of about 50 $m^2/g$ to 1000 $m^2/g$ and a bulk density less than about 64 $kg/m^3$ by continuous feeding to a compacting apparatus as described above in the first embodiment of the invention to form a densified particulate silica and continuous feeding the densified particulate silica to a compounding apparatus adapted for blending the densified silica into a curable silicone composition.

The curable silicone compositions that can be compounded by the method of this embodiment of the invention are as described above. The compounding apparatus can be any of those known in the art for use in compounding curable silicone compositions such as mixers and extruders. In a preferred process the densified particulate silica is fed directly from the compacting apparatus to an extruder which serves to form a uniform dispersion of the densified particulate silica in the curable silicone composition. Those skilled in the art will recognize that the densified particulate silica may first be dispersed in one or more components of the curable silicone composition such as all or a portion of the polydiorganosiloxane polymer to form a master batch to which the other components are added. In some cases it may be desirable to separately package certain components of the curable silicone compositions such as catalyst and crosslinker to prevent curing during storage and shipping.

The following examples are provided to illustrate the present invention. These examples are not intended to limit the scope of the claims herein.

EXAMPLE 1

A curable silicone sealant composition was formed having the composition described in Table 1. The silica was Cabot MS-7 fumed silica (Cabot Corporation, Cab-O-Sil Div., Tuscola, Ill.) having a BET surface area of about 200 $m^2/g$ and a bulk density of about 48 $kg/m^3$ prior to densification. The silica was densified by feeding to a compacting apparatus purchased from J R Johanson, Inc., San Luis Obispo, Calif., as described here in and in the preferred embodiment of U.S. Pat. No. 5,052,874. The densified silica was feed to a compounding extruder and mixed with the other components of the composition. Plateau stress values were determined after the composition had set for 7 days at ambient temperature as an indication of the slump characteristics of the silicone sealant composition. The Plateau stress values were determined on a Carri-Med Rheometer (Model CSL 500, TA Instruments, New Castle, Del.) using a cone and plate. The cone was a 0.5 degree, 2 cm diameter cone and the gap between the cone and the plate was 13 microns. The sealant mixture was place on a temperature controlled bottom plate of the rheometer and the plate raised into position with the cone to provide a specimen thickness of 13 microns. The test specimen was allowed to equilibrate for 1 to 5 minutes to reach 25° C. A stress of 2500 Pa was applied for 30 seconds and then the stress was ramped down to 10 Pa in 5 minutes. The plateau stress was measured as the value of stress at which flow of the composition was detectable. In a first composition the silica was densified to 88 $kg/m^3$ and in a second composition the silica was densified to 126 $kg/m^3$. The plateau stress value for the composition compounded with the silica densified to 88 $kg/m^3$ was 2736 $dyne/cm^2$ and the plateau stress value for the composition compound with silica densified to 126 $kg/m^3$ was 2678 $dyne/cm^2$, or about a 2.1% decrease in the plateau stress value for the composition having the more densified silica.

TABLE 1

| Wt. % | Component Description |
|---|---|
| 6.6 | Silica |
| 88.8 | 70 mPa·s hydroxy end-terminated polydimethylsiloxane |
| 4.6 | 1:1 mixture of methyltriacetoxysilane and ethyltriacetoxysilane |
| 0.02 | dibutyltin dilaurate |

EXAMPLE 2 (Comparison example)

Sample silicone sealant compositions of the same formulation as described in Table 1 where prepared using commercially densified fumed silicas manufactured by Cabot Corporation and densified by passing between the nip of two juxtaposed rollers under vacuum. The trade name and density of the silicas in their undensified and densified versions are given in Table 2. The plateau stress value for each composition was tested as described in Example 1 and are reported in Table 2. The data demonstrates the significant reduction of the plateau stress values that can occur in composition comprising silica densified by a standard commercial method.

TABLE 2

| Trade name | BET Surface Area ($m^2/g$) | Density ($kg/m^3$) | Plateau Stress ($dyne/cm^2$) |
|---|---|---|---|
| LM150 | 160 | 40 | 4448 |
| LM150D | 160 | 80 | 1810 |
| A200 | 200 | 40 | 5520 |
| A200VS | 200 | 100 | 2547 |

We claim:

1. A method for densifying particulate silica comprising feeding particulate silica to a compacting apparatus comprising in combination a screw feeder having a thread and extending in a horizontal direction and the compacting apparatus comprising a number of sections arrayed in succession along the screw feeder length so as to subject the particulate silica to a succession of operations, the sections comprising
   a) a feeding section extending into a source chamber for drawing particulate solids from the source chamber into the compacting apparatus,
   b) a feed seal section, adjacent the feeding section where the screw feeder therein has a screw pitch the same as in the adjacent portion of the feeding section, c) a conveying section adjacent to the feed seal section where the screw feeder thread has a pitch greater than that in the feed seal section to provide greater solids-moving capacity than the feed seal section, d) a recirculating section adjacent the conveying section where the screw feeder thread has substantially the same pitch as in the conveying section, e) a high pressure section where the screw feeder thread has substantially the same pitch as in the recirculating section, f) a recirculation chamber through which the screw feeder extends, the recirculation chamber including i) a feeder seal shroud closely surrounding the feed seal section of the screw feeder and ii) a high pressure shroud closely surrounding the high pressure section of the screw feeder and having an output end, the recirculation chamber further enclosing the conveying section and the recirculation section to confine particulate silica blown out of the high pressure section as the particulate silica is compressed thereby, and g) a hinge mounted preloaded cover in yieldable sealing engagement with the output end of the high pressure shroud to permit densified particulate silica pressurized by the high pressure section to emerge under pressure from the high pressure shroud.

2. A method for densifying particulate silica according to claim 1, where the particulate silica is a fumed silica having a surface area within a range of about 50 $m^2/g$ to 1000 $m^2/g$ and a bulk density less than about 64 $kg/m^3$.

3. A method for densifying particulate silica according to claim 1, where the particulate silica has a bulk density less than about 64 $kg/m^3$.

4. A method for compounding a curable silicone composition comprising a reinforcing silica filler, the method comprising (A) densifying a particulate silica having a surface area within a range of about 50 $m^2/g$ to 1000 $m^2/g$ by continuous feeding to a compacting apparatus comprising in combination a screw feeder having a thread and extending in a horizontal direction and the compacting apparatus comprising a number of sections arrayed in succession along the screw feeder length so as to subject the particulate silica to a succession of operations, the sections comprising a) a feeding section extending into a source chamber for drawing particulate solids from the source chamber into the compacting apparatus, b) a feed seal section, adjacent the feeding section where the screw feeder therein has a pitch the same as in the adjacent portion of the feeding section, c) a conveying section adjacent to the feed seal section where the screw feeder thread has a pitch greater than that in the feed seal section to provide greater solids-moving capacity than the feed seal section, d) a recirculating section adjacent the conveying section where the screw feeder thread has substantially the same pitch as in the conveying section, e) a high pressure section where the screw feeder thread has substantially the same pitch as in the recirculating section, f) a recirculation chamber through which the screw feeder extends, the recirculation chamber including i) a feeder seal shroud closely surrounding the feed seal section of the screw feeder and ii) a high pressure shroud closely surrounding the high pressure section of the screw feeder and having an output end, the recirculation chamber further enclosing the conveying section and the recirculation section to confine particulate silica blown out of the high pressure section as the particulate silica is compressed thereby, and g) a hinge mounted preloaded cover in yieldable sealing engagement with the output end of the high pressure shroud to permit densified particulate silica pressurized by the high pressure section to emerge under pressure from the high pressure shroud and B) continuous feeding the densified particulate silica to a compounding apparatus adapted for blending the densified silica into one or more components of a curable silicone composition contained therein.

5. A method for compounding a curable silicone composition according to claim 4, where the particulate silica is a fumed silica.

6. A method for compounding a curable silicone composition according to claim 4, where the particulate silica has a bulk density less than about 64 $kg/m^3$.

7. A method for compounding a curable silicone composition according to claim 4, where the densified particulate silica has a bulk density within a range of about 80 $kg/m^3$ to 160 $kg/m^3$.

8. A method for compounding a curable silicone composition according to claim 4, where the densified particulate silica comprises about 5 to 50 weight percent of the total content of the compounding apparatus.

9. A method for compounding a curable silicone composition according to claim 4, where the curable silicone composition is a curable silicone sealant composition.

10. A method for compounding a curable silicone composition according to claim 4, where the curable silicone composition is a curable silicone rubber composition.

11. A method for densifying particulate silica according to claim 1, where the densified particulate silica has a bulk density within a range of about 80 $kg/m^3$ to 160 $kg/m^3$.

* * * * *